UNITED STATES PATENT OFFICE 1,977,756

PROCESS FOR THE MANUFACTURE OF LIGHT MATERIALS FOR BUILDING AND OTHER PURPOSES

Paul Dutoit, Lausanne, Switzerland

No Drawing. Application January 14, 1932, Serial No. 586,710. In Switzerland January 20, 1931

5 Claims. (Cl. 204—1)

The present invention has for its object the manufacture of light materials for building and other purposes.

It is a known fact that in order to obtain materials of this kind, it is only necessary to distribute as regularly as possible fine gas bubbles in a binder which sets after some time, cement for example. A known process consists in adding, in as intimate mixture as possible, aluminium powder to dry cement. At the moment of the mixing of the cement, the aluminium reacts upon the water thereby producing gaseous hydrogen and the cement swells and occupies a larger apparent volume.

The difficulty of the said process, and generally speaking of all those in which gases are produced by a chemical reaction or fermentation, consists in the fact that it would be necessary to cause the setting of the cement to coincide with the end of the reaction. In fact, if setting takes place before the end of the reaction, the mass is not sufficiently swollen, and if setting takes place after the end of the reaction, a part of the gas escapes from the still pasty mass and the volume of the said mass diminishes. In both cases, the effect looked for is only partially attained.

It is therefore necessary to resort to artifices in order to cause the duration of the reaction to vary and to take into account the time of setting of the cement rather than the mechanical qualities of the light material which is obtained.

The applicant has found out that this disadvantage was in close connection with the size of the gaseous bubbles as formed and that the more the size of the said bubbles was reduced, the longer the emulsion formed could remain in a sticky or pasty state without losing too strong a proportion of its gases. He further discovered a process allowing to obtain in such a plastic mass gas bubbles whose average volume is smaller than a thousandth of a cubic millimeter.

The rising motion of bubbles having such a small diameter in the plastic paste is exceedingly slow. It becomes therefore possible to produce the gaseous emulsion in the binder mixed with water, to cast the said emulsion into moulds and to wait till the cement has set without practically any loss of gas or any formation of stratification of various densities.

According to this process, the bubbles are formed by way of electrolysis in the mass mixed with water. In order to obtain the disclosed result, that is to say bubbles of an exceedingly small volume, the pasty mass must move rapidly relatively to the electrodes so as to constantly brush their surface. The electrolysis is effected either with alternating current or with direct current and in this latter case the anode is to be scraped constantly on account of the thickening of the paste which is produced by cataphoresis in the vicinity of the said electrode.

The density of the final product obtained is dependent of course upon the proportion of gas introduced into the mass by electrolysis. The said density will be the smaller that the electrolysis will last for a longer time with an equal intensity of current, or that the intensity of current will be stronger for an equal duration.

The applicant has moreover ascertained that the material of which the electrodes are made is not without importance as regards the success of the operation, but that it had a certain influence upon the size of the bubbles as obtained. For example, when it is proceeded with direct current with a nickel anode and an iron cathode, the first emulsions are in fact obtained in a satisfactory manner, but after a certain number of operations, the quality of the said emulsions is decreasing. This is due to the fact that, in spite of the abrasive action of the cement which tends to scale and polish in a constant manner the metal surface, there takes place, in a general manner, an unequal electrolytic attack of the metal, so that after a certain period of use, the electrode allows at numerous points the formation of bubbles which are sensibly larger than those which are obtained at the beginning and that the emulsion is no longer as fine and homogeneous as the one which is obtained at the beginning with unattacked electrodes. The applicant has found that, in conveniently selecting the material of the movable electrodes, it was perfectly possible to avoid this inconvenience and that particularly electrodes made of an alloy of the "inoxidable steel" type were undergoing a perfectly regular slow wear, without spots which are the cause of large bubbles. He has, moreover, ascertained that the use of electrodes of this kind allowed the electrolysis to proceed with alternating current to which iron electrodes would not easily lend themselves.

During the electrolysis of mixed cement, the following phenomenon is observed:

The swelling of the mass begins but after some time and goes on with acceleration from the beginning to the end of the operation, although the intensity of the electric current remains constant.

This is probably due to considerable pressures existing within gas bubbles of very small size as given by the said process. The gases begin to solve in the mixing water and the bubbles cannot really be formed and subsist only when a certain saturation is obtained.

Be that as it may, the applicant has ascertained that he was able to obtain the formation of a particularly fine, homogenous and extremely steady emulsion, in lowering, by any process whatever, the superficial tension of the liquid and that the swelling of the cement then began much earlier. In order to lower the superficial tension, the applicant proceeds to the addition of liquids which are soluble like the alcohols with a high molecular weight, for example the amyl alcohol. It is also possible to successfully use animal and vegetable albumens, gelatins, algins, in the measure in which these products are capable of lowering the superficial tension of the water and, consequently, of reducing in strong proportions the work required by the formation of the bubble, which work is exerted against capillary powers.

In carrying out the process in the manner which has just been described, the applicant has succeeded in obtaining materials having the property of affording a good mechanical resistance, although of a very small density, going even beneath 0,3.

In the case of pieces having a large size, it is however advantageous, in order to avoid the internal tensions resulting from inequal shrinkage in the various areas whilst the cement is setting, to add to the fresh emulsion the same emulsion already formed and hardened after the same has been crushed, sorted and that the grains resulting from this sorting operation have been mixed in granulometric proportions. The applicant has ascertained that the adherence between the fresh emulsion and the hardened one was a perfect one, that the internal tension distributed in an infinitely better manner did no longer threaten the strength of the cast or moulded pieces and that consequently the material afforded a much greater safety than if the same resulted directly and without mixture from fresh emulsion. The advantage which is obtained is particularly quite remarkable with the materials of very small density ranging between 0,5 and 0,3. It often happens, in fact, that bulky pieces obtained directly from the fresh emulsion and having such densities, suddenly crack after a certain time, which never occurs when the same are derived from a judicious mixture of fresh emulsion and of the same hardened and granulated emulsion.

The process can also be used in connection with other electrolyzable binders, such as lime, plaster, water or hydraulic limes, and the like.

What I claim is:

1. The method of manufacturing a light weight construction material which consists in wetting a binding material such as cement, lime, gypsum or the like, and producing gas bubbles in the mass by electrolysis before setting of the mass takes place.

2. The method of manufacturing a light weight construction material which consists in wetting a binding material such as cement, lime, gypsum or the like, subjecting the wetted mass to electrolysis to produce a gaseous emulsion therein, and maintaining the mass in motion during the period of electrolysis.

3. The method of manufacturing a light weight construction material which consists in wetting a binding material such as cement, lime, gypsum or the like, and subjecting the wetted mass, prior to setting thereof, to electrolysis at such a rate and intensity as to produce in the mass gas bubbles having an average volume less than one thousandth of a cubic millimeter.

4. The method of manufacturing a light weight construction material which consists in mixing water with a binding material such as cement, lime, gypsum or the like, adding to the mixing water a material to considerably reduce its superficial tension, and subjecting the wet mass to electrolysis prior to setting thereof to produce gas bubbles therein.

5. The method of manufacturing a light weight construction material which consists in wetting a binding material such as cement, lime, gypsum or the like, subjecting the wetted mass to electrolysis to produce gas bubbles therein, pulverizing the mass after it has set, wetting another quantity of a binding material such as cement, lime, gypsum or the like, subjecting the second mentioned mass to electrolysis to produce gas bubbles therein, and adding to the second mentioned mass, prior to setting thereof and in granulometric proportion, a quantity of the pulverized first mentioned material.

PAUL DUTOIT.